US009338159B2

(12) United States Patent
Bajko (10) Patent No.: US 9,338,159 B2
(45) Date of Patent: May 10, 2016

(54) METHOD AND APPARATUS FOR SHARING WIRELESS NETWORK SUBSCRIPTION SERVICES

(75) Inventor: Gabor Bajko, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 41 days.

(21) Appl. No.: 13/423,653

(22) Filed: Mar. 19, 2012

(65) Prior Publication Data

US 2013/0247161 A1  Sep. 19, 2013

(51) Int. Cl.
*G06F 21/33* (2013.01)
*H04L 29/06* (2006.01)
*H04L 9/32* (2006.01)
*H04W 12/06* (2009.01)
*H04W 84/12* (2009.01)
*H04W 8/20* (2009.01)

(52) U.S. Cl.
CPC .......... *H04L 63/0823* (2013.01); *H04L 9/3268* (2013.01); *H04W 12/06* (2013.01); *H04L 2209/80* (2013.01); *H04W 8/20* (2013.01); *H04W 84/12* (2013.01)

(58) Field of Classification Search
None
See application file for complete search history.

(56) References Cited

U.S. PATENT DOCUMENTS

| 6,301,658 | B1 * | 10/2001 | Koehler .......................... 713/155 |
| 6,640,097 | B2 * | 10/2003 | Corrigan et al. ............ 455/414.1 |
| 7,308,574 | B2 * | 12/2007 | Dare et al. ....................... 713/157 |
| 7,430,606 | B1 | 9/2008 | Meandzija et al. |
| 7,650,137 | B2 * | 1/2010 | Jobs et al. ....................... 455/405 |
| 2002/0099822 | A1 * | 7/2002 | Rubin et al. .................. 709/225 |
| 2003/0163700 | A1 | 8/2003 | Paatero |
| 2005/0149723 | A1 * | 7/2005 | Watkins et al. ............... 713/156 |
| 2006/0075242 | A1 | 4/2006 | Aissi et al. |
| 2006/0143134 | A1 * | 6/2006 | So et al. ........................... 705/59 |
| 2006/0218396 | A1 * | 9/2006 | Laitinen et al. ............... 713/167 |
| 2009/0132808 | A1 * | 5/2009 | Baentsch et al. ............. 713/152 |
| 2010/0031029 | A1 * | 2/2010 | Ilyadis .......................... 713/156 |
| 2010/0325427 | A1 * | 12/2010 | Ekberg et al. ................. 713/156 |
| 2012/0072976 | A1 * | 3/2012 | Patil et al. ......................... 726/6 |
| 2013/0232561 | A1 * | 9/2013 | Gupta .............................. 726/5 |

FOREIGN PATENT DOCUMENTS

EP   2 096 830 A1   9/2009
WO   WO 2011/084117 A1   7/2011

OTHER PUBLICATIONS

International Search Report and Written Opinion for Application No. PCT/FI2013/050210 dated Jul. 4, 2013.
Supplementary European Search Report for Application No. EP 13 76 4977 dated Oct. 23, 2015.

* cited by examiner

*Primary Examiner* — Lisa Lewis
*Assistant Examiner* — Henry Tsang
(74) *Attorney, Agent, or Firm* — Alston & Bird LLP (57) ABSTRACT

A method, apparatus and computer program product are provided for enabling multiple mobile terminals to access a subscription service. The method may further include causing a client certificate to be issued to the first mobile terminal as a result of the certificate enrollment procedure. In some example embodiments, the client certificate comprises a subscription identifier and a flag indicating whether the client certificate is to be sharable with a second mobile terminal. The method may further include causing a certificate enrollment procedure to be initiated by a second mobile terminal with the first mobile terminal in an instance in which the first mobile terminal possesses one or more credentials that are configured to be shared with another mobile terminal. The method may further include the second mobile terminal receiving at least one credential in the form of a client certificate from the first mobile terminal.

20 Claims, 5 Drawing Sheets

METHOD AND APPARATUS FOR SHARING WIRELESS NETWORK SUBSCRIPTION SERVICES

TECHNOLOGICAL FIELD

Some embodiments of the present invention relate generally to communications technology and, more particularly, to shared subscriptions in wireless environments.

BACKGROUND

Procedures are defined to allow a user operating a wireless communications enabled terminal to purchase and/or access a subscription to a wireless network, in Hotspot 2.0, even if the user operating the mobile terminal does not have a prior relationship with or subscription to the wireless network. The details of the purchased subscription, to include credentials, may be provisioned to the mobile terminal at the time of the purchase of the subscription. A plurality of credentials may be supported by the wireless network, such as but not limited to username/password and/or a client certificate. In an instance in which the credentials are username/password, the username/password may be shared among a number of devices belonging to the same user. However, the ability to share credentials does not apply if the credentials issued to the mobile terminal include a client certificate. By definition the client certificate is generated based on a private/public key that is specific to the particular mobile terminal and thus is generally non-transferrable.

BRIEF SUMMARY

A method, apparatus and computer program product are therefore provided according to example embodiments to enable a user of a first mobile terminal to share a client certificate that provides access to a wireless network subscription service, with other mobile terminals. The client certificate may be shared by expanding the procedure defined for creating a wireless subscription, such as the Hotspot 2.0 wireless provisioning specification. According to some example embodiments, the first mobile terminal is initially issued a client certificate by a server that provides access credentials to a wireless network subscription service. Advantageously, a second mobile terminal may then, for example, connect to the first mobile terminal in order to obtain a client certificate, generated by the first mobile terminal that may also be used to gain network access using the subscription belonging to the first terminal. Thus, in an instance in which the second mobile terminal attempts to be authenticated by the server using the client certificate generated by the first mobile terminal, the server is configured to recognize the client certificate as issued by the first mobile terminal and thus grants the second mobile terminal access to the wireless network subscription service.

In one embodiment, a method is provided that comprises determining whether a first mobile terminal possesses one or more credentials that are configured to be shared with another mobile terminal. In some example embodiments, the credentials comprise a subscription identifier issued by a server and the credentials are configured to grant access to one or more wireless network subscription services. The method of this embodiment may also include causing a certificate enrollment procedure to be initiated with the first mobile terminal in an instance in which the first mobile terminal possesses one or more credentials that are configured to be shared with another mobile terminal. The method of this embodiment may also include receiving a client certificate from the first mobile terminal. In some example embodiments, the client certificate is signed by the first mobile terminal and comprises the subscription identifier.

In another embodiment, an apparatus is provided that includes at least one processor and at least one memory including computer program code with the at least one memory and the computer program code being configured, with the at least one processor, to cause the apparatus to at least determine whether a first mobile terminal possesses one or more credentials that are configured to be shared with another mobile terminal. In some example embodiments, the credentials comprise a subscription identifier issued by a server and are configured to grant access to one or more wireless network subscription services. The at least one memory and computer program code may also be configured to, with the at least one processor, cause the apparatus to cause a certificate enrollment procedure to be initiated with the first mobile terminal in an instance in which the first mobile terminal possesses one or more credentials that are configured to be shared with another mobile terminal. The at least one memory and computer program code may also be configured to, with the at least one processor, cause the apparatus to receive a client certificate from the first mobile terminal. In some example embodiments, the client certificate is signed by the first mobile terminal and comprises a subscription identifier.

In the further embodiment, a computer program product may be provided that includes at least one non-transitory computer-readable storage medium having computer-readable program instructions stored therein with the computer-readable program instructions including program instructions configured to determine whether a first mobile terminal possesses one or more credentials that are configured to be shared with another mobile terminal. In some example embodiments, the credentials comprise a subscription identifier issued by a server and are configured to grant access to one or more wireless network subscription services. The computer-readable program instructions may also include program instructions configured to cause a certificate enrollment procedure to be initiated with the first mobile terminal in an instance in which the first mobile terminal possesses one or more credentials that are configured to be shared with another mobile terminal. The computer-readable program instructions may also include program instructions configured to receive a client certificate from the first mobile terminal. In some example embodiments, the client certificate is signed by the first mobile terminal and comprises a subscription identifier.

In yet another embodiment, an apparatus is provided that includes means for determining whether a first mobile terminal possesses one or more credentials that are configured to be shared with another mobile terminal. In some example embodiments, the credentials comprise a subscription identifier issued by a server and the credentials are configured to grant access to one or more wireless network subscription services. The apparatus of this embodiment may also include means for causing a certificate enrollment procedure to be initiated with the first mobile terminal in an instance in which the first mobile terminal possesses one or more credentials that are configured to be shared with another mobile terminal. The apparatus of this embodiment may also include means for receiving a client certificate from the first mobile terminal. In some example embodiments, the client certificate is signed by the first mobile terminal and comprises the subscription identifier.

In one embodiment, a method is provided that comprises receiving an authentication request for access to a wireless network subscription service from a second mobile terminal. The method of this embodiment may also include determining whether the authentication request comprises a client certificate having subscription identifier belonging to a first mobile terminal that has previously been authenticated. The method of this embodiment may also include causing the second mobile terminal to be authenticated on the wireless network subscription service based on the client certificate issued by the first mobile terminal containing the subscription identifier.

In another embodiment, an apparatus is provided that includes at least one processor and at least one memory including computer program code with the at least one memory and the computer program code being configured, with the at least one processor, to cause the apparatus to at least receive an authentication request for access to a wireless network subscription service from a second mobile terminal. The at least one memory and computer program code may also be configured to, with the at least one processor, cause the apparatus to determine whether the authentication request comprises a client certificate having subscription identifier belonging to a first mobile terminal that has previously been authenticated. The at least one memory and computer program code may also be configured to, with the at least one processor, cause the apparatus to cause the second mobile terminal to be authenticated on the wireless network subscription service based on the client certificate issued by the first mobile terminal containing the subscription identifier.

In the further embodiment, a computer program product may be provided that includes at least one non-transitory computer-readable storage medium having computer-readable program instructions stored therein with the computer-readable program instructions including program instructions configured to receive an authentication request for access to a wireless network subscription service from a second mobile terminal. The computer-readable program instructions may also include program instructions configured to determine whether the authentication request comprises a client certificate having subscription identifier belonging to a first mobile terminal that has previously been authenticated. The computer-readable program instructions may also include program instructions configured to cause the second mobile terminal to be authenticated on the wireless network subscription service based on the client certificate issued by the first mobile terminal containing the subscription identifier.

In yet another embodiment, an apparatus is provided that includes means for receiving an authentication request for access to a wireless network subscription service from a second mobile terminal. The apparatus of this embodiment may also include means for determining whether the authentication request comprises a client certificate having subscription identifier belonging to a first mobile terminal that has previously been authenticated. The apparatus of this embodiment may also include means for causing the second mobile terminal to be authenticated on the wireless network subscription service based on the client certificate issued by the first mobile terminal containing the subscription identifier.

BRIEF DESCRIPTION OF THE DRAWINGS

Having thus described the example embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Some example solutions for wireless network subscription sharing enable a mobile terminal with a client certificate to function as an access point. Thus, the mobile terminal, acting as an access point, routes traffic to the wireless network subscription service from other mobile terminals that do not have the client certificate. However, such solutions only enable access to the wireless network subscription service in an instance in which the mobile terminal with the client certificate is available, in communications range and/or the like.

As described herein, a method, apparatus and computer program product of an example embodiment of the present invention may be configured to operate in conjunction with Hotspot 2.0 to enable sharing of a wireless network subscription by a plurality of mobile terminals, without the need for a mobile terminal to function as an access point. An example second mobile terminal of an example embodiment of the current invention may be configured to connect to a first mobile terminal in order to determine whether the first mobile terminal has access to a wireless network subscription service. A wireless network subscription service includes, but is not limited to, one or more subscriptions to one or more wireless networks and/or subscription services operating on a wireless network. In an instance in which the first terminal has access to one or more subscriptions, the second mobile terminal may request access credentials relating to the one or more subscriptions. The first mobile terminal assumes the role of the certificate authority and may be configured to generate a client certificate for the second mobile terminal based on a subscription identifier, such as a WiFiSubscriptionID, present in the client certificate issued to the first mobile terminal by a server.

Figure 1:
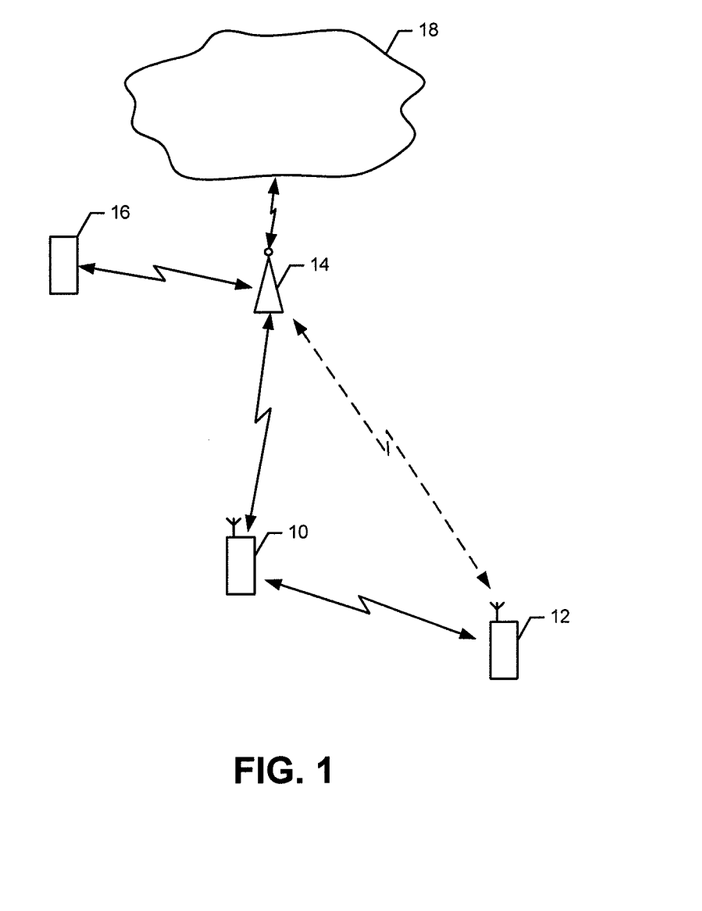
FIG. 1 is a schematic representation of a system having at least two mobile terminals that may benefit from an embodiment of the present invention.

Although the method, apparatus and computer program product may be implemented in a variety of different systems, one example of such a system is shown in FIG. 1, which includes communication devices (for example, mobile terminal 10 and mobile terminal 12) that are capable of communication via a network entity 14, such as a wireless router, a base station, a Node B, an evolved Node B (eNB), WiFi Station, or other network entity, with a network 18 (for example, a core network). While the network may be configured in accordance with wireline or wireless networking techniques, comprising but not limited to WiFi, wireless local access network (WLAN) techniques such as Institute of Electrical and Electronics Engineers (IEEE) 802.11, 802.16, and/or the like. The network entity 14 may be in communication with a server 16. The server 16 may be configured to provide access credentials, such as a username/password or client certificate for access to the network 18 via the network entity 14.

Other communications may be envisioned, but are not required in the current invention such as Long Term Evolution (LTE) or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like. Alternatively or additionally. The network 18 may include a collection of various different nodes, devices or functions that may be in communication with each other via corresponding wired and/or wireless interfaces. For example, the network may include one or more cells, including network entity 14, each of which may serve a respective coverage area. As described herein, the network 18, may be configured to operate as a wireless network subscription service. The serving cell and the neighbor cells could be, for example, part of one or more cellular or mobile networks or public land mobile networks (PLMNs). In turn, other devices such as processing devices (for example, personal computers, server computers or the like) may be coupled to the mobile terminal 10, the mobile terminal 12 and/or other communication devices via the network 18.

A communication device, such as the mobile terminal 10 and/or mobile terminal 12 (also known as user equipment (UE), wireless station (STA), communications device or the like), may be in communication with other communication devices or other devices via the network entity 14 and, in turn, the network 18. In some cases, the communication device may include an antenna for transmitting signals to and for receiving signals from a serving cell.

In some example embodiments, the mobile terminal 10 and/or the mobile terminal 12 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal 10 and/or the mobile terminal 12 may include one or more processors that may define processing circuitry either alone or in combination with one or more memories. The processing circuitry may utilize instructions stored in the memory to cause the mobile terminal 10 and/or the mobile terminal 12 to operate in a particular way or execute specific functionality when the instructions are executed by the one or more processors. The mobile terminal 10 and/or the mobile terminal 12 may also include communication circuitry and corresponding hardware/software to enable communication with other devices and/or the network 18.

Figure 2:
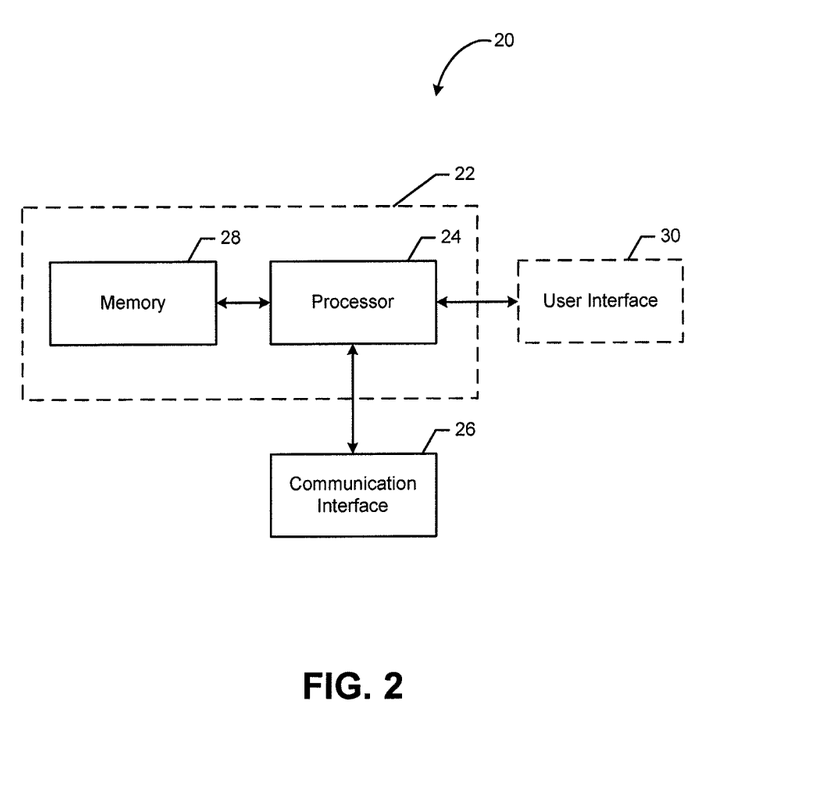
FIG. 2 is a block diagram of an apparatus that may be embodied by a mobile terminal in accordance with one embodiment of the present invention.

In one embodiment, for example, the mobile terminal 10, the mobile terminal 12 and/or the network entity 14 may be embodied as or otherwise include an apparatus 20 as generically represented by the block diagram of FIG. 2. While the apparatus 20 may be employed, for example, by a mobile terminal 10, a mobile terminal 12 or a network entity 14, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In some example embodiments, the processing circuitry 22 may include a processor 24 and memory 28 that may be in communication with or otherwise control a communication interface 26 and, in some cases, a user interface 30. As such, the processing circuitry may be embodied as a circuit chip (for example, an integrated circuit chip) configured (for example, with hardware, software or a combination of hardware and software) to perform operations described herein. However, in some embodiments taken in the context of the mobile terminal 10, the processing circuitry may be embodied as a portion of a mobile computing device or other mobile terminal.

The user interface 30 (if implemented) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. The apparatus 20 need not always include a user interface. For example, in instances in which the apparatus is embodied as a network entity 14, the apparatus may not include a user interface. As such, the user interface is shown in dashed lines in FIG. 2.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 18 and/or any other device or module in communication with the processing circuitry 22, such as between the mobile terminal 10, the mobile terminal 12 and the network entity 14. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet, device to device, peer to peer, Bluetooth, wireless communications or other methods.

In an example embodiment, the memory 28 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 28 or otherwise accessible to the processor. As such, whether configured by hardware or by a combination of hardware and software, the processor may represent an entity (for example, physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Figure 3:
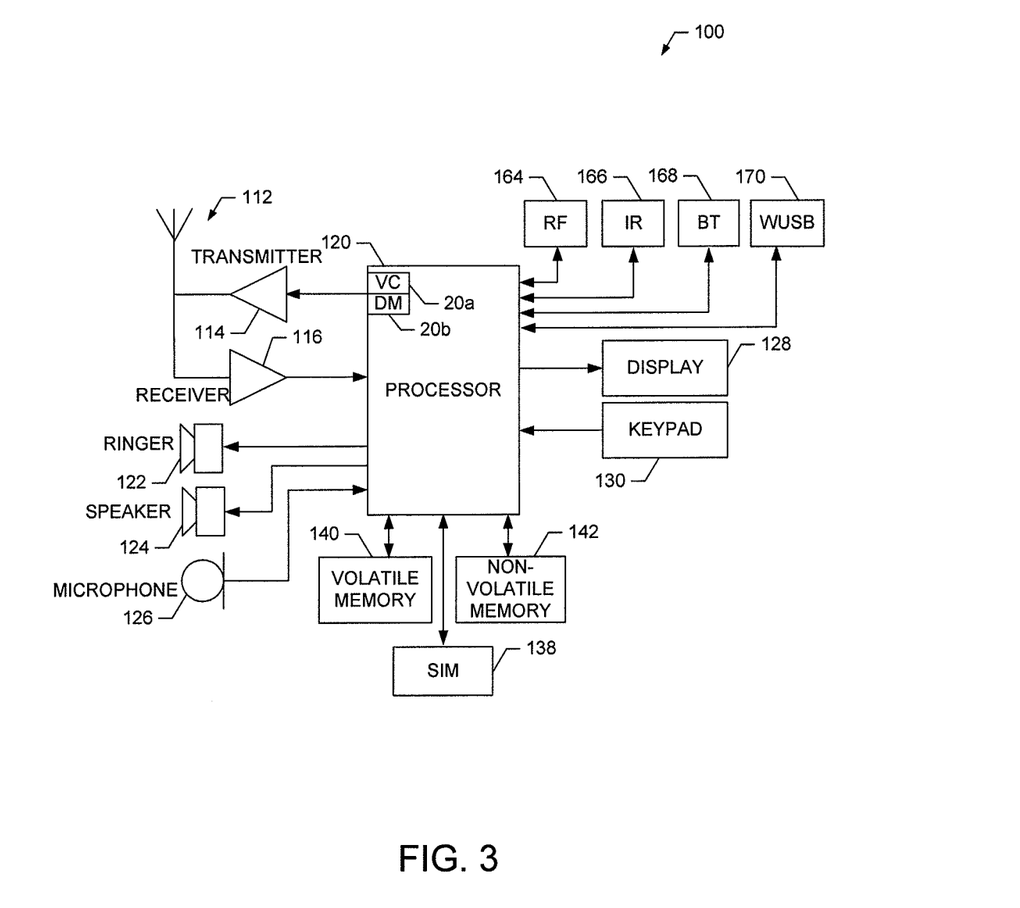
FIG. 3 illustrates a block diagram of a mobile terminal according to some example embodiments of the current invention.

Alternatively or additionally, mobile terminal 10 and/or mobile terminal 12 may be embodied as or otherwise include an apparatus 100 as generically represented by the block diagram of FIG. 3. It should be understood, however, that the mobile terminal 10 and/or mobile terminal 12 illustrated and hereinafter described is merely illustrative of one type of computing device that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 and/or mobile terminal 12 may include an antenna 112 (or multiple antennas 112) in communication with a transmitter 114 and a receiver 116. The mobile terminal 10 and/or mobile terminal 12 may also include a processor 120 configured to provide signals to and receive signals from the transmitter and receiver, respectively. The processor 120 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, or some combination thereof. Accordingly, although illustrated in FIG. 3 as a single processor, in some example embodiments the processor 120 may comprise a plurality of processors. These signals sent and received by the processor 120 may include signaling information in accordance with an air interface standard of an applicable cellular system, and/or any number of different wireline or wireless networking techniques, comprising but not limited to Wi-Fi, wireless local access network (WLAN) techniques such as Bluetooth™ (BT), Ultra-wideband (UWB), Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols such as LTE Advanced and/or the like as well as similar wireless communication protocols that may be developed in the future.

Some Narrow-band Advanced Mobile Phone System (VAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 and/or mobile terminal 12 may be capable of operating according to Wi-Fi or Worldwide Interoperability for Microwave Access (WiMAX) protocols.

It is understood that the processor 120 may comprise circuitry for implementing audio/video and logic functions of the mobile terminal 10 and/or mobile terminal 12. For example, the processor 120 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 120a, an internal data modem (DM) 210b, and/or the like. Further, the processor may comprise functionality to operate one or more software programs, which may be stored in memory. For example, the processor 120 may be capable of operating a connectivity program, such as a web browser. The connectivity program may allow the mobile terminal 10 and/or mobile terminal 12 to transmit and receive web content, such as location-based content, according to a protocol, such as Wireless Application Protocol (WAP), hypertext transfer protocol (HTTP), and/or the like. The mobile terminal 10 and/or mobile terminal 12 may be capable of using Transmission Control Protocol/Internet Protocol (TCP/IP) to transmit and receive web content across the internet or other networks.

The mobile terminal 10 and/or mobile terminal 12 may also comprise a user interface including, for example, an earphone or speaker 124, a ringer 122, a microphone 126, a display 128, a user input interface, and/or the like, which may be operationally coupled to the processor 120. In this regard, the processor 120 may comprise user interface circuitry configured to control at least some functions of one or more elements of the user interface, such as, for example, the speaker 124, the ringer 122, the microphone 126, the display 128, and/or the like. The processor 120 and/or user interface circuitry comprising the processor 120 may be configured to control one or more functions of one or more elements of the user interface through computer program instructions (for example, software and/or firmware) stored on a memory accessible to the processor 120 (for example, volatile memory 140, non-volatile memory 142, and/or the like). The mobile terminal may comprise a battery for powering various circuits related to the mobile terminal, for example, a circuit to provide mechanical vibration as a detectable output. The user input interface may comprise devices allowing the mobile terminal to receive data, such as a keypad 130, a touch display, a joystick, and/or other input device. In embodiments including a keypad, the keypad may comprise numeric (0-9) and related keys (#, *), and/or other keys for operating the mobile terminal.

As shown in FIG. 3, the mobile terminal 10 and/or mobile terminal 12 may also include one or more means for sharing and/or obtaining data. For example, the mobile terminal may comprise a short-range radio frequency (RF) transceiver and/or interrogator 164 so data may be shared with and/or obtained from electronic devices in accordance with RF techniques. The mobile terminal may comprise other short-range transceivers, such as, for example, an infrared (IR) transceiver 166, a Bluetooth™ (BT) transceiver 168 operating using Bluetooth™ brand wireless technology developed by the Bluetooth™ Special Interest Group, a wireless universal serial bus (USB) transceiver 170 and/or the like. The Bluetooth™ transceiver 168 may be capable of operating according to low power/energy or ultra-low power/energy Bluetooth™ technology (for example, Wibree™) radio standards. In this regard, the mobile terminal 10 and/or mobile terminal 12 and, in particular, the short-range transceiver may be capable of transmitting data to and/or receiving data from electronic devices within a proximity of the mobile terminal, such as within 10 meters, for example. The mobile terminal may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The mobile terminal 10 and/or mobile terminal 12 may comprise memory, such as a removable or non-removable subscriber identity module (SIM) 138, a soft SIM 138, a fixed SIM 138, a removable or non-removable universal subscriber identity module (USIM) 138, a soft USIM 138, a fixed USIM 138, a removable user identity module (R-UIM), and/or the like, which may store information elements related to a mobile subscriber. In addition to the SIM, the mobile terminal may comprise other removable and/or fixed memory. The mobile terminal 10 and/or mobile terminal 12 may include volatile memory 140 and/or non-volatile memory 142. For example, volatile memory 140 may include Random Access Memory (RAM) including dynamic and/or static RAM, on-chip or off-chip cache memory, and/or the like. Non-volatile memory 142, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 140 non-volatile memory 142 may comprise a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10 and/or mobile terminal 12.

Figure 4:
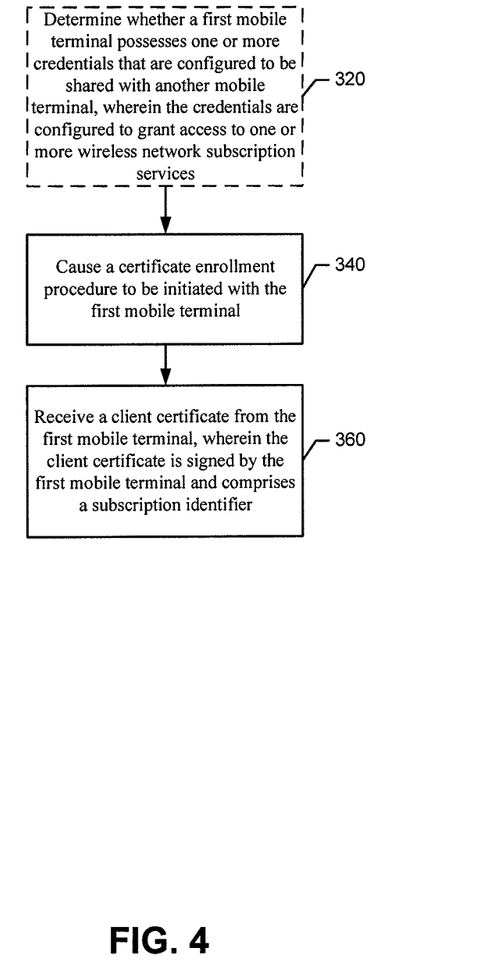
FIG. 4 is a flow chart illustrating operations performed by a first mobile terminal and a second mobile terminal in accordance with one embodiment of the present invention.
Figure 5:
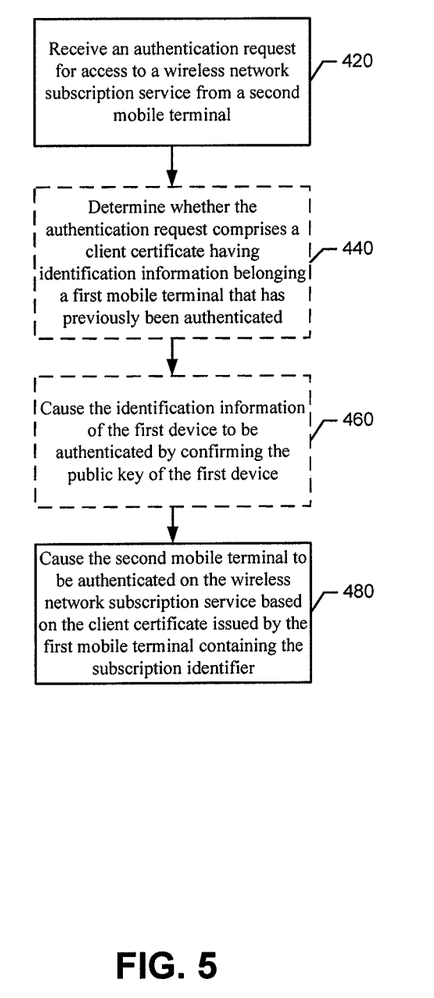
FIG. 5 is a flow chart illustrating operations performed by a server in accordance with one embodiment of the present invention.

FIGS. 4 and 5 are flowcharts illustrating the operations performed by a method, apparatus and computer program product, such as apparatus 20 of FIG. 2, in accordance with some example embodiments of the present invention is illustrated. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 28 of an apparatus employing an embodiment of the present invention and executed by a processor 24 in the apparatus. As will be appreciated, any such computer program instructions may be loaded onto a computer or other programmable apparatus (for example, hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 4 and 5, when executed, convert a computer or processing circuitry into a particular machine configured to perform an example embodiment of the present invention. Accordingly, the operations of FIGS. 4 and 5 define an algorithm for configuring a computer or processing circuitry 22, for example, processor, to perform an example embodiment. In some cases, a general purpose computer may be provided with an instance of the processor which performs the algorithms of FIGS. 4 and 5 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included (an example of which is shown in dashed lines in FIG. 4). It should be appreciated that each of the modifications, optional additions or amplifications below may be included with the operations above either alone or in combination with any others among the features described herein.

Referring now to FIG. 4, the operations of a method, apparatus and computer program product of an example embodiment are configured to cause a client certificate to be issued to a second mobile terminal by a first mobile terminal. The client certificate used by the second mobile terminal is derived from and/or based on a client certificate issued to the first mobile terminal by a server that provides access credentials based on a wireless subscription provisioning specification. In some example embodiments, the wireless subscription provisioning specification, such as the Hotspot 2.0 specification, may enable one or more mobile terminals registered to a particular user to access the same provisioned subscription based on the systems and methods described herein, even in an instance in which the wireless network subscription service requires a client certificate.

In some example embodiments, a first mobile terminal, such as mobile terminal 10, may initiate a subscription purchase procedure, such as, for example, the subscription purchase procedure specified in Hotspot 2.0. If the credential provided to the terminal as a result of the subscription purchase is a client certificate, the first mobile terminal may be required to enroll in client certificate creation during a subscription creation procedure. The client certificate creation consists of generating a public/private key pair at the terminal, and sending the public key to the server. In some example embodiments, the server may include a subscription identifier, such as a WiFiSubscriptionID, into the generated client certificate and may also include a flag which may explicitly state whether the server supports subscription sharing or not. In some example embodiments, the WiFiSubscriptionID can be a random value or a value predefined by the server 16, network entity 14, the network 18 or the like, is configured to be generated by the server and assigned to a particular subscriber of the wireless network subscription service. Alternatively or additionally, the WiFiSubscriptionID may also be added to the subscriptionMO field of the Hotspot2.0 defined WiFi subscription managed object structure. The server 16 is then configured to generate a client certificate, signed by a private key generated by the server 16, and transmit the client certificate to the first mobile terminal, such as mobile terminal 10.

Once the client certificate is received by the first mobile terminal, such as mobile terminal 10, the first mobile terminal may then use that client certificate to authenticate itself to the server 16. However, at this stage, only the first mobile terminal is configured to authenticate itself on the server, but a second mobile terminal, such as mobile terminal 12, is not configured to access the network 18 using the same client certificate because the client certificate issued to the first mobile terminal contains the public key of the first mobile terminal. The client certificate of the first mobile terminal relates to the private key of the first mobile terminal and thus cannot be transferred to the second mobile terminal.

According to some example embodiments, however, the first mobile terminal may be able to issue a client certificate to the second mobile terminal, such that the second mobile terminal may be authenticated onto the network 18 via the network entity 14, depending on whether the client certificate issued to the first terminal includes a WiFiSubscriptionID and in an instance in which there is a flag indicating that sharing the subscription is permitted, the flag is set to true. In some example embodiments and in order to accomplish the issuance of the certificate, the second mobile terminal, such as mobile terminal 12, may cause a connection with the first mobile terminal. The connection may be any peer to peer connection, such as but not limited to, a Bluetooth, a WiFi Direct, a USB cable or other connection. Once connected to the first mobile terminal, as is shown in operation 320, the apparatus 20 embodied by mobile terminal 12, may include means, such as the processing circuitry 22, the processor 24 or the like, for determining whether a first mobile terminal possesses one or more credentials that allow sharing of the credentials with another mobile terminal, wherein the credentials are configured to grant access to one or more wireless network subscription services.

In some example embodiments, the apparatus 20 embodied by mobile terminal 12, may include means, such as the processing circuitry 22, the processor 24, the communications interface 26 or the like, for causing a message to be transmitted to the first mobile terminal in an instance in which the first mobile terminal possesses one or more credentials that allow sharing of the credentials with another mobile terminal. In some example embodiments, as shown in operation 340, the apparatus 20 embodied by mobile terminal 12, may include means, such as the processing circuitry 22, the processor 24, the communications interface 26 or the like, for causing a certification enrollment procedure to be initiated with the first terminal by sending an initial message, which can include, for example, an Hypertext Transfer Protocol (HTTP) GET message with a predefined uniform resource indicator (URI) like 'localhost' in the URI field. Alternatively or additionally the URI may include the first mobile terminals internet protocol (IP) address. A message, such as the GET message, indicates to the first mobile terminal that the second mobile terminal is requesting a client certificate to be issued that is configured to grant access to the wireless network subscription service. In some example embodiments, the first mobile terminal functions as a certificate authority or as a server for the second terminal. As described herein the certificate enrollment procedure is the process by which the first mobile terminal generates a client certificate for the second mobile terminal In some example embodiments, the apparatus 20 embodied by mobile terminal 12, may include means, such as the processing circuitry 22, the processor 24 or the like, for generating a public/private key pair. As is shown in operation 380, the apparatus 20 may include means, such as the processing circuitry 22, the processor 24, the communications interface 26 or the like, for causing a public key to be transmitted to the first mobile terminal based on a generated public/private key pair.

As is shown in operation 360, the apparatus 20 may include means, such as the processing circuitry 22, the processor 24, the communications interface 26 or the like, for receiving a client certificate from the first mobile terminal, wherein the client certificate is signed by the first mobile terminal and includes a subscription identifier, such as the WiFiSubscriptionID. In some example embodiments, the subscription identifier is present in the client certificate the first mobile terminal received from the server at subscription creation phase. In some example embodiments, the first mobile terminal is configured to enable access to a wireless network subscription service for a second mobile terminal by a generating a client certificate for the second mobile terminal and signing it with its own private key. The client certificate created by the first mobile terminal, such as mobile terminal 10, may also include the WiFiSubscriptionID.

Referring now to FIG. 5, the operations of a method, apparatus and computer program product are configured to authenticate a second mobile terminal on a wireless network subscription service based on a client certificate issued by a first mobile terminal. In some example embodiments, the second mobile terminal may cause a client certificate, generated by the first mobile terminal as described with reference to FIG. 4, to be transmitted to the server in an attempt to access the wireless network subscription service. As is shown in operation 420, the apparatus 20, such as server 16, may include means, such as the processing circuitry 22, the processor 24, the communications interface 26 or the like, for receiving an authentication request for a subscription service from a second mobile terminal.

As is shown in operation 440, the apparatus 20, such as server 16, may include means, such as the processing circuitry 22, the processor 24, the communications interface 26 or the like, for determining whether the authentication request comprises a client certificate having subscription identifier, such as a WiFiSubscriptionID, belonging to a first mobile terminal that has previously been authenticated. In some example embodiments, the server 16 may be configured to trust the first mobile terminal in the role of certificate authority for that particular WiFiSubscriptionID. As is shown in operation 460, the apparatus 20, such as server 16, may include means, such as the processing circuitry 22, the processor 24 or the like, for causing the subscription identifier of the first mobile terminal to be authenticated by confirming the public key of the first mobile terminal. In some example embodiments, the client certificate provided by the second mobile terminal may contain the public key of the second mobile terminal signed with the private key of the first mobile terminal. Since the server 16 is already configured to trust the first mobile terminal for the particular wireless subscription, see for example FIG. 4, the server 16 is configured to verify, such as by the processing circuitry 22, the processor 24 or the like, the public key of the first mobile terminal. In some example embodiments, the public key is trusted if the WiFiSubscriptionID string in second mobile terminal client certificate is the same as the WiFiSubscriptionID used to issue the client certificate for first mobile terminal.

As is shown in operation 480, the apparatus 20 may include means, such as the processing circuitry 22, the processor 24, the communications interface 26 or the like, for causing the second mobile terminal to be authenticated on the wireless network subscription service based on the client certificate issued by the first terminal and the subscription identifier. In some example embodiments, the second mobile device is considered a child device of the first mobile terminal and is able to access the wireless network subscription service identified by WiFiSubscriptionID. For example, a challenge sent from the server to the second mobile terminal may be signed by the private key of the second mobile terminal and the server may further be configured to verify if the public key of the second mobile, as signed by the private key of first mobile terminal, belongs to the private key used to sign the challenge.

In some example embodiments, a revocation of a second mobile terminal client certificate may occur either during a new sync process between first mobile terminal and second mobile terminal or by the server revoking the client certificate issued to the first mobile terminal (for example which implicitly removes the trust from the first mobile terminal and from all devices first mobile terminal issued a client certificate). If there is any time or data limit on the subscription, then the time or data limit would be applied against the subscription if the first and/or the second mobile terminal is authenticated to use the subscription.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   determining whether a first mobile terminal possesses one or more first credentials that are configured to be issuable to another mobile terminal, wherein at least one of the one or more first credentials comprise a subscription identifier issued by a server and the at least one of the one or more first credentials is configured to grant access to one or more wireless network subscription services;

causing, by a processor, a certificate enrollment procedure to be initiated by the first mobile terminal in an instance in which the first mobile terminal possesses one or more first credentials that are configured to be issuable to the another mobile terminal, wherein the certificate enrollment procedure results in a public key to be transmitted to the first mobile terminal and a first client certificate to be issued to the first mobile terminal that comprises a subscription identifier and a flag indicating whether the first client certificate is able to be shared with the another mobile terminal;

receiving at least one second credential that is distinct from the first credential and is in the form of a client certificate generated by the first mobile terminal, the client certificate comprising the public key of the another mobile terminal signed by a private key of the first mobile terminal and having the subscription identifier; and accessing the one or more wireless network subscription services with the client certificate based on a verification of the private key and the subscription identifier.

2. The method according to claim 1, wherein the first mobile terminal is configured to initiate a subscription purchase procedure with the server such that the first mobile terminal enrolls in a certificate creation process.

3. The method according to claim 2, wherein the certificate creation process further comprises receiving a client certificate from the server, and wherein the subscription identifier is a WiFiSubscriptionID.

4. The method according to claim 1 further comprising causing a message to be transmitted to the first mobile terminal, wherein the message is a Hypertext Transfer Protocol (HTTP) GET message that comprises a predefined uniform resource identifier.

5. The method according to claim 1, wherein the client certificate from the first mobile terminal enables access a subscription to the one or more wireless network subscription services belonging to the first mobile terminal.

6. An apparatus comprising:
at least one processor; and
at least one memory including computer program code, the at least one memory and the computer program code configured to, with the at least one processor, cause the apparatus to at least:
determine whether a first mobile terminal possesses one or more credentials that are configured to be issuable to another mobile terminal, wherein at least one of the one or more first credentials comprise a subscription identifier issued by a server and the at least one of the one or more first credentials is configured to grant access to one or more wireless network subscription services;
cause a certificate enrollment procedure to be initiated by the first mobile terminal in an instance in which the first mobile terminal possesses one or more first credentials that are configured to be issuable to the another mobile terminal, wherein the certificate enrollment procedure results in a public key to be transmitted to the first mobile terminal and a first client certificate to be issued to the first mobile terminal that comprises a subscription identifier and a flag indicating whether the first client certificate is able to be shared with the another mobile terminal;
receive at least one second credential that is distinct from the first credential and is in the form of a client certificate generated by the first mobile terminal, the client certificate comprising the public key of the another mobile terminal signed by a private key of the first mobile terminal and having the subscription identifier; and
access the one or more wireless network subscription services with the client certificate based on a verification of the private key and the subscription identifier.

7. The apparatus according to claim 6, wherein the first mobile terminal is configured to initiate a subscription purchase procedure with the server such that the first mobile terminal enrolls in a certificate creation process.

8. The apparatus according to claim 7, wherein the certificate creation process further comprises receiving a client certificate from the server, and wherein the subscription identifier is a WiFiSubscriptionID.

9. The apparatus according to claim 6 wherein the at least one memory including the computer program code is further configured to, with the at least one processor, cause the apparatus to cause a message to be transmitted to the first mobile terminal, wherein the message is a Hypertext Transfer Protocol (HTTP) GET message that comprises a predefined uniform resource identifier.

10. The apparatus according to claim 6, wherein the client certificate from the first mobile terminal enables access a subscription to the one or more wireless network subscription services belonging to the first mobile terminal.

11. A method comprising:
receiving a certificate enrollment procedure request from a first mobile terminal;
causing, by a processor, a first client certificate to be issued to the first mobile terminal as a result of the certificate enrollment procedure initiated by the first mobile terminal, wherein the first client certificate comprises a subscription identifier and a flag indicating whether the client certificate is able to be shared with an issuable to at least a second mobile terminal;
receiving an authentication request for access to a wireless network subscription service from the second mobile terminal, wherein the authentication request comprises a second client certificate of the second mobile terminal signed by a private key of the first mobile terminal and having the subscription identifier, the second client certificate being distinct from the first client certificate; and
causing the second mobile terminal to be authenticated with the second client certificate based upon verification of the private key and the subscription identifier.

12. The method according to claim 11, further comprising:
determining whether the client certificate has the subscription identifier belonging to that first mobile terminal that was previously issued and comprises a flag indicating that the client certificate is issuable to the second mobile terminal.

13. The method according to claim 12, further comprising:
causing the subscription identifier of the first mobile terminal to be authenticated by confirming a public key of the first mobile terminal in the second client certificate.

14. The method according to claim 12 wherein the first mobile terminal is configured to operate as a certificate authority, wherein the second mobile terminal is authenticated based on credentials issued by the first mobile terminal.

15. The method according to claim 12, further comprising authenticating a second mobile terminal in an instance in which a subscription identifier in the second client certificate is the same as the subscription identifier in the first client certificate issued to the first mobile terminal, wherein the subscription identifier is a WiFiSubscriptionID.

16. The method according to claim 12, further comprising:
causing a challenge to be transmitted to the second mobile terminal, wherein the challenge is signed by a private key of the second mobile terminal; and
determining whether a public key of the second mobile terminal that is signed by a private key of the first mobile terminal is verified based on the challenge.

17. The method according to claim 12, further comprising:
causing the first client certificate of the first mobile terminal to be revoked such that the second client certificate issued to the second mobile terminal is revoked.

18. The method according to claim 12, further comprising:
determining data usage of the first mobile terminal based on data usage of the first mobile terminal and the second mobile terminal.

19. The method according to claim 12, wherein the authentication request is Hotspot 2.0 authentication request.

20. The method according to claim 12, wherein the second mobile terminal is authenticated on the wireless network subscription service based on a subscription of the first mobile terminal.

* * * * *